United States Patent
Brock (10) Patent No.: US 7,293,711 B2
(45) Date of Patent: Nov. 13, 2007

(54) COMBINATION BARCODE IMAGING/DECODING AND REAL-TIME VIDEO CAPTURE SYSTEM

(75) Inventor: Christopher Warren Brock, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/929,936

(22) Filed: Aug. 30, 2004

(65) Prior Publication Data

US 2006/0043193 A1 Mar. 2, 2006

(51) Int. Cl.
*G06K 7/10* (2006.01)

(52) U.S. Cl. ............... 235/462.01; 235/462.08; 235/462.11; 235/462.13; 235/462.17; 235/462.41; 235/470; 235/379

(58) Field of Classification Search ........... 235/462.01, 235/462.08, 462.17, 462.11, 462.13, 462.41, 235/470, 379
See application file for complete search history.

(56) References Cited

U.S. PATENT DOCUMENTS

| | | | |
|---|---|---|---|
| 4,958,064 A | * | 9/1990 | Kirkpatrick ............... 235/384 |
| 5,682,030 A | | 10/1997 | Kubon |
| 6,726,094 B1 | * | 4/2004 | Rantze et al. ............... 235/379 |
| 6,772,950 B2 | * | 8/2004 | He ............................. 235/470 |
| 2004/0056100 A1 | * | 3/2004 | He ............................. 235/470 |
| 2004/0262398 A1 | * | 12/2004 | Blake et al. ............ 235/462.45 |

FOREIGN PATENT DOCUMENTS

EP 0873 013 A2 10/1998

OTHER PUBLICATIONS

International Search Report, Dec. 19, 2005.

* cited by examiner

*Primary Examiner*—Allyson N Trail
(74) *Attorney, Agent, or Firm*—Carter, DeLuca, Farrell & Schmidt, LLP (57) ABSTRACT

A combination barcode imager/decoder and real-time video capture system is provided. The system is configured for being implemented at a POS location for performing the functions of barcode imaging and decoding, and real-time video capture for video surveillance purposes. The system includes an imager or imaging sensor and a switching mechanism for switching and operating the imager between a barcode imaging and decoding mode for imaging and decoding barcodes positioned in proximity to the imager, and a real-time video capture mode for capturing real-time video for video surveillance purposes.

33 Claims, 4 Drawing Sheets

COMBINATION BARCODE IMAGING/DECODING AND REAL-TIME VIDEO CAPTURE SYSTEM

BACKGROUND OF THE INVENTION

1. Technical Field

The present disclosure relates generally to barcode imaging/decoding systems and real-time video capture systems for video surveillance purposes. In particularly, the present disclosure relates to a combination barcode imaging/decoding and real-time video capture system. More particularly, the present disclosure relates to a point-of-sale barcode imaging/decoding and real-time video capture system.

2. Description of the Prior Art

Point-of-sale (POS) systems, such as self-checkout POS stations which enable consumers to scan product barcodes and purchase products without the aid of a sales clerk, are widely implemented at point-of-sale locations in many retail outlets. The POS locations are generally monitored by video surveillance systems having a plurality of video cameras to deter theft of products by consumers using self-checkout POS stations or to aid in apprehending thieves who commit robbery by accosting a retail clerk at a POS station.

Sometimes in an effort to reduce costs, the retail outlets employ a single video camera for capturing real-time video of a field of view which can include within it several POS stations. The real-time video is typically transmitted to a video surveillance monitoring system for enabling security personnel to conduct video surveillance. In order for each POS station to be in the field of view or line-of-sight of the video camera, the single video camera is positioned at a substantial distance from each POS station. It has been observed that an individual at a self-checkout POS station who intends to steal items is aware of the video camera in the line-of-sight of the POS station. The individual typically positions himself in a manner which blocks the line-of-sight and security personnel monitoring the incoming real-time video from the video camera are unable to detect whether the individual is stealing items.

A need therefore exists for a combination barcode imaging/decoding and real-time video capture system which can be positioned at the POS location to perform the functions of barcode imaging and decoding, and real-time video capture for video surveillance purposes. A need also exists for a POS station, such as a self-checkout POS station, having an imager or imaging sensor which performs the functions of barcode imaging and decoding, and real-time video capture.

SUMMARY OF THE INVENTION

The present disclosure provides a combination barcode imaging/decoding and real-time video capture system. The system is configured for being implemented at a POS location for performing the functions of barcode imaging and decoding, and real-time video capture for video surveillance purposes. The system includes an imager or imaging sensor as known in the art and a switching mechanism for switching and operating the imager between a barcode imaging and decoding mode for imaging and decoding barcodes positioned in proximity to the imager, and a real-time video capture mode for capturing real-time video for video surveillance purposes. The present disclosure further provides a POS station, such as a self-checkout POS station, having the features of the combination system.

The present disclosure further provides a method for selectively operating the combination barcode imaging/decoding and real-time video capture system between a real-time video capture mode for video surveillance purposes and barcode imaging and decoding mode. In one method of operation, the combination barcode imaging/decoding and real-time video capture system is selectively operated or switched between the two modes by detecting whether a barcode scanner housing the imager is positioned within a cradle. If the barcode scanner is positioned within the cradle, a signal is transmitted to a processing unit within the barcode scanner to operate the scanner in the real-time video capture mode. If the barcode scanner is not positioned within the cradle, the signal is not transmitted to the processing unit and the scanner is operated in a barcode imaging and decoding mode.

In another method of operation, the combination barcode imaging/decoding and real-time video capture system is selectively operated or switched between two modes of operation by determining if a barcode is positioned in proximity to the imager using conventional image processing techniques. A proximity sensor as known in the art is used for determining if an object is positioned within a predetermined distance range from the barcode scanner. If it is determined that an object is positioned within the predetermined distance range from the barcode scanner, the processing unit freezes a real-time image of the real-time video images relayed by the imager to the processing unit.

The processing unit then determines using conventional image processing techniques whether the image includes a barcode. If it is determined that the image includes a barcode, the processing unit switches the mode of operation from the real-time video capture mode to the barcode imaging and decoding mode, in order to re-image and decode the barcode. It is contemplated that the image relayed to the processing unit can be used decoding the barcode without re-imaging the barcode.

In both methods of operation, the imaged barcode data is relayed to the processing unit of the barcode scanner or some other processing unit of the combination barcode imaging/decoding and real-time video capture system for decoding and thereby, determining the type of item, the price and/or other information for the scanned item as known in the art. A total cost for all the scanned items is then tallied by the system and displayed on a monitor.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

As described in detail in this section, the present disclosure provides a combination or integrated barcode imaging/decoding and real-time video capture system. The system is configured for being implemented at a POS location for performing the functions of barcode imaging and decoding, and real-time video capture for video surveillance purposes. The system includes an imager or imaging sensor as known in the art and a switching mechanism for switching and operating the imager between a barcode imaging and decoding mode for imaging and decoding barcodes positioned in proximity to the imager, and a real-time video capture mode for capturing real-time video for video surveillance purposes. The present disclosure further provides a POS station, such as a self-checkout POS station, having the features of the combination system.

Figure 1:
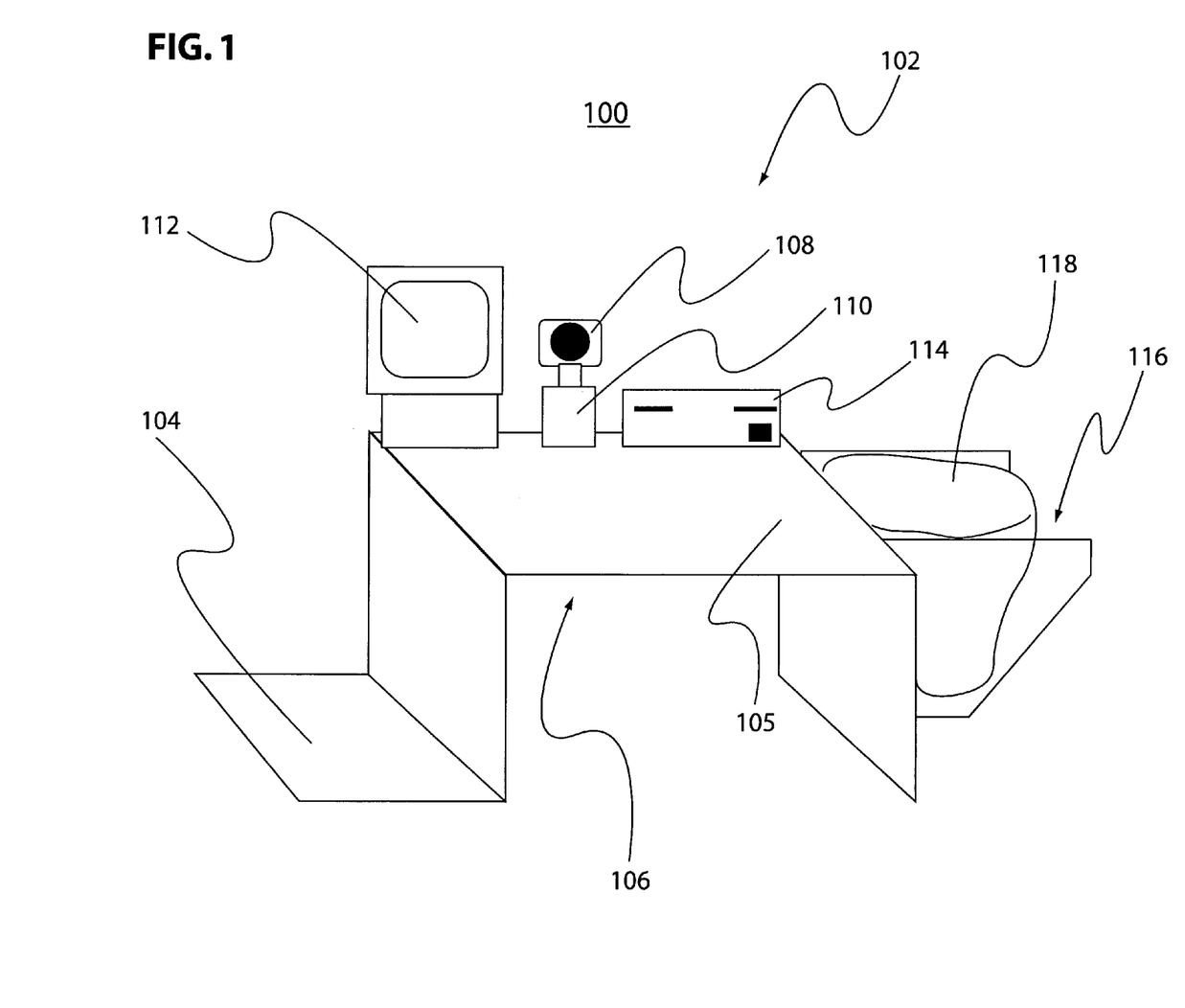
FIG. 1 is a schematic illustrating a combination barcode imaging/decoding and real-time video capture system in accordance with the present disclosure.

An exemplary embodiment of the combination system having a POS station is shown by FIG. 1 and designated generally by reference numeral 100. The POS station is of the self-checkout type which may include a weighing station and electronic article surveillance (EAS) system as known in the art. It is contemplated that other types of POS stations can be used with the system 100 of the present disclosure besides self-checkout POS stations. In FIG. 1, the POS station is designated by reference numeral 102.

The POS station 102 includes a holding area 104 for placing items prior to scanning their respective barcodes. A checkout area 106 is provided adjacent to the holding area 104 having a working surface 105. The working surface 105 includes a barcode scanner 108 having an imager or imaging sensor 200, such as a charge-coupled device (CCD), and a lens assembly 202 housed within a housing 204. The imager 200 is preferably an imaging engine configured and dimensioned to fit within a predetermined form factor of the barcode scanner.

The barcode scanner 108 further includes a triggering mechanism 206 (see FIGS. 2 and 2A) for actuating a barcode imaging and decoding operation as known in the art and a processing unit 208 having at least one processor for executing a set of programmable instructions for operating the barcode scanner 108 and performing the functions described herein for the barcode scanner 108. The barcode scanner 108 further includes communication circuitry 209 and a battery pack 210 for enabling wireless operation of the barcode scanner 108.

The processing unit 208 of the barcode scanner 108 in accordance with the present disclosure is capable of operating the barcode scanner 108 between a barcode imaging and decoding mode and a real-time video capture mode. The real-time video capture mode is similar in operation as that of a video camera, where moving video images are captured.

Figure 2:
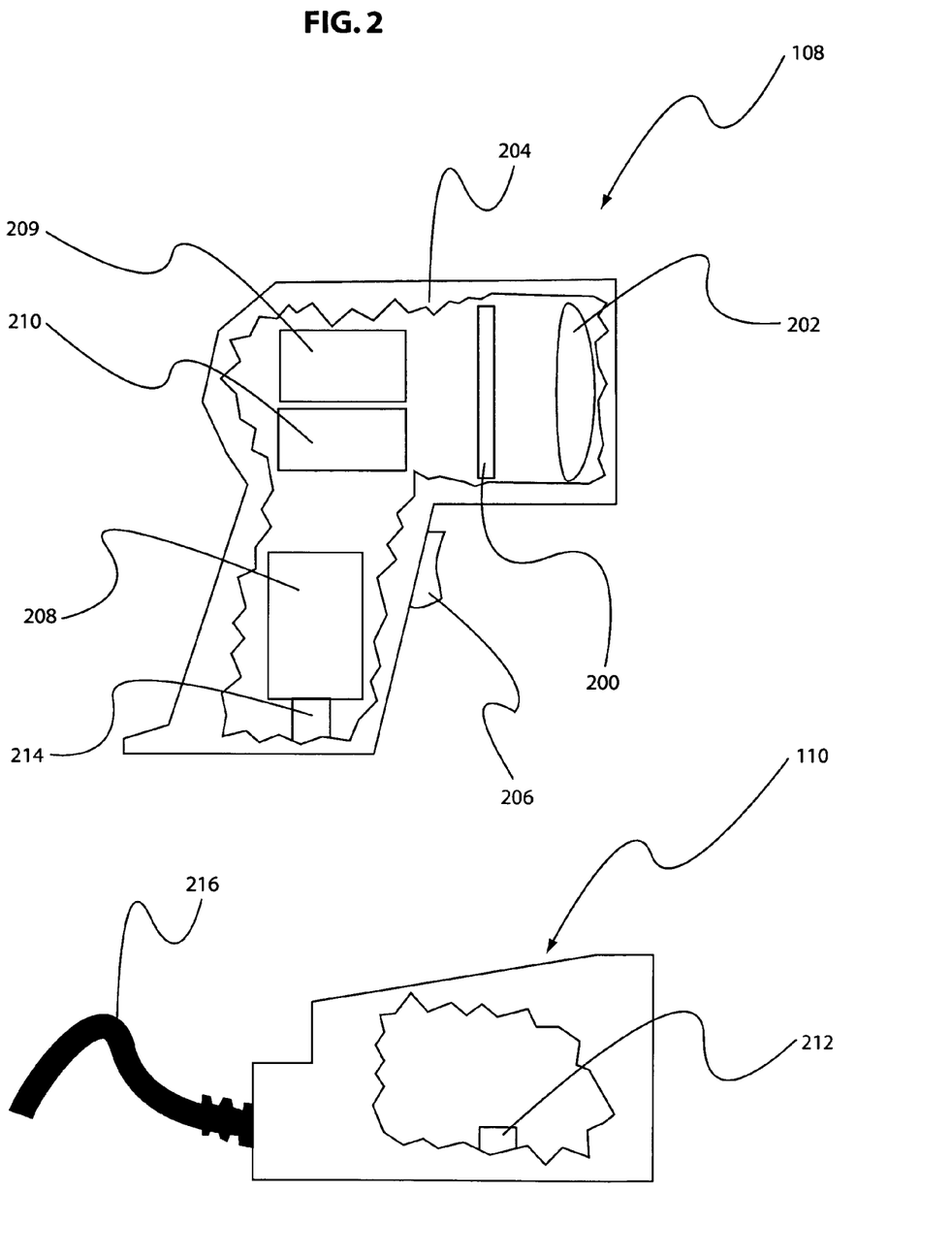
FIG. 2 is a schematic illustrating a barcode scanner and a cradle for placing the barcode scanner therein in accordance with the present disclosure.

In one embodiment of the barcode scanner 108, switching between the two modes of operation is facilitated by the use of a cradle 110 configured and dimensioned for positioning the barcode scanner 108 therein. The cradle 110 includes a switching mechanism for transmitting a signal to the processing unit 208 for effecting switching between the two modes of operation according to whether the barcode scanner 108 is positioned within the cradle 110.

With reference to FIG. 2, the switching mechanism includes a data interface connector 212 having data interface pins for connecting to a driver 214 on the barcode scanner 108. Upon the pins of the data interface connector 212 being connected to the driver 214, a signal is relayed from the data interface connector 212 to the driver 214, and subsequently from the driver 214 to the processing unit 208. The signal instructs the processing unit 208 to switch the mode of operation of the barcode scanner 108 from the barcode imaging and decoding mode to the real-time video capture mode.

One or more additional signals can be related to the processing unit 208 from the data interface connector 212. The signals preferably provide software updates, including symbology decoding algorithms for one- and two-dimensional symbologies for programming or re-programming a decoding unit of the processing unit 208.

The real-time video captured during the operation of the barcode scanner 108 in the real-time video capture mode is transmitted to a video surveillance monitoring system via a cable 216 connected to the cradle 110. Accordingly, when a user simply drops the barcode scanner 108 within the cradle 110, the barcode scanner automatically becomes a video camera and thereby captures real-time video which is transmitted to the video surveillance monitoring system or other type of system. It is contemplated that the cradle 110 further includes a battery charger for charging the battery pack 210 when the barcode scanner 108 is positioned within the cradle 110.

On the other hand, when the user picks up the barcode scanner 108, the data interface connector 212 is disconnected from the driver 214 of the barcode scanner 108 and the signal is no longer relayed to the processing unit 208. The processing unit 208 then switches the barcode scanner to the barcode imaging and decoding mode. During this mode, the barcode scanner 108 is used to image and decode a barcode and transmit the decoded barcode data via the communications circuitry 209 to the cradle 110. The cradle 110 in turn relays the decoded data via the cable 216 to a monitor 112 for display. The display can include item and price information with respect to the scanned item.

Figure 2A:
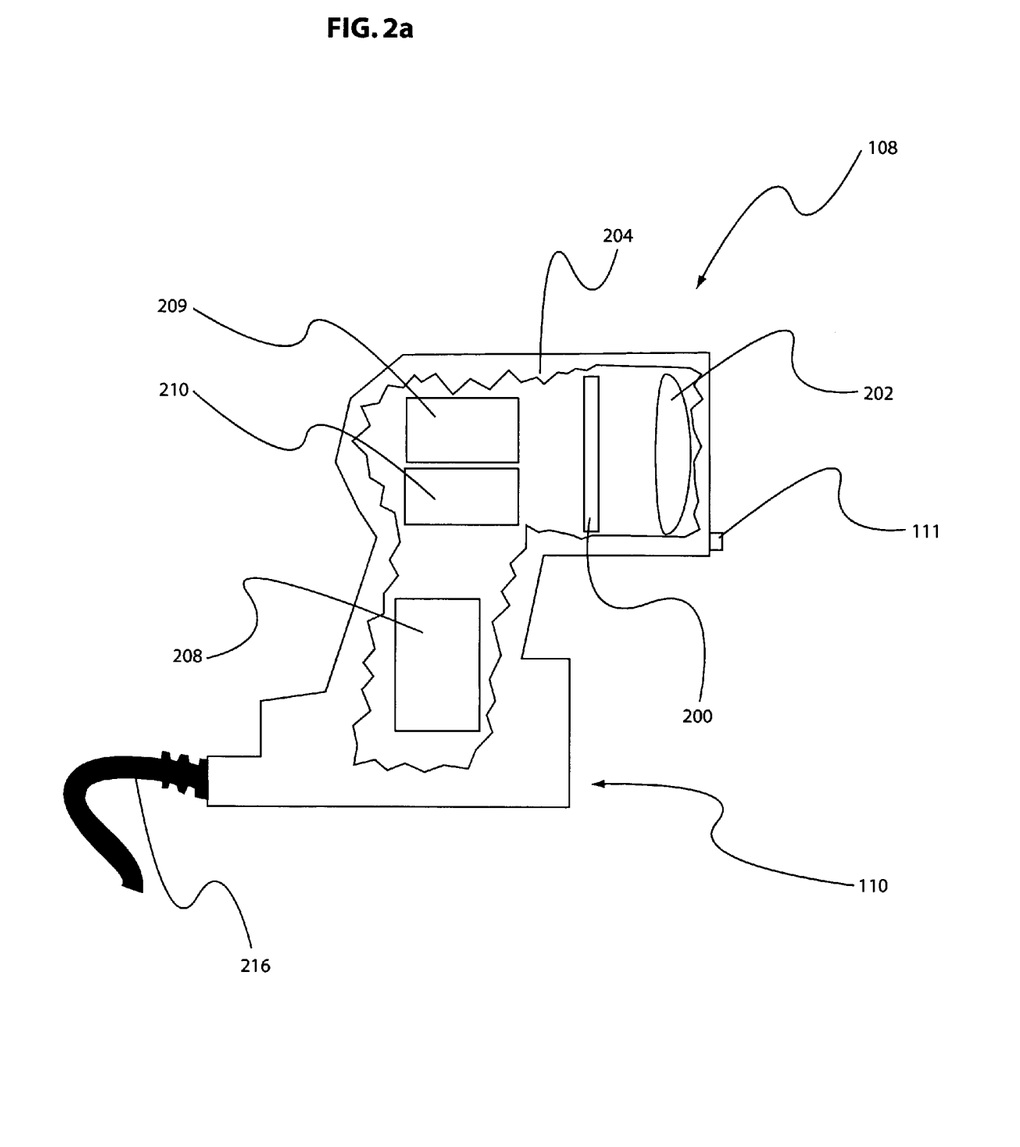
FIG. 2A is a schematic illustrating a barcode scanner having a proximity sensor in accordance with the present disclosure.

In an alternate embodiment of the barcode scanner 108, as shown by FIG. 2A, the barcode scanner 108 is continuously operated in the real-time video capture mode unless it is determined that a barcode is positioned in the field of view of the barcode scanner 108 and within a predetermined distance range from the barcode scanner 108. In this embodiment, the switching mechanism includes the processing unit 208 and a proximity sensor 111 positioned on the barcode scanner 108 for sensing whether an object is within the predetermined distance range from the barcode scanner 108. If an object is sensed to be within the predetermined distance range, e.g., within 10 centimeters, from the barcode scanner 108 by the proximity sensor 111, the proximity sensor 111 transmits a signal to the processing unit 208 of the barcode scanner 108. Upon receiving the signal, the processing unit 208 freezes a real-time image of the real-time video images relayed by the imager to the processing unit 208.

The processing unit 208 then determines using conventional image processing techniques, including techniques for determining whether an image includes a barcode, whether the real-time image includes a barcode. If the image is determined to include a barcode, the processing unit 208 switches the mode of operation of the barcode scanner 108 from the real-time video capture mode to the barcode imaging and decoding mode, in order to re-image and decode the barcode. The processing unit then automatically switches the barcode scanner 108 back to the real-time video capture mode. It is contemplated that the image relayed to the processing unit 208 can be used for decoding the barcode without re-imaging the barcode. It is also contemplated that the barcode scanner 108 of this embodiment is continuously operated in the real-time video capture mode, but real-time images of the real-time video images relayed by the imager to the processing unit 208 are frozen and used for decoding the barcodes.

If it is determined that the image relayed to the processing unit does not include a barcode, the processing unit 208 does not switch the operating mode of the barcode scanner 108 from the real-time video capture mode to the barcode imaging and decoding mode.

With reference to FIG. 1, the working surface 105 of the system 100 further includes a payment processing apparatus 114 connected to the barcode scanner 108 and the monitor 112 for enabling a consumer to pay for the items scanned. The payment processing apparatus 114, as known in the art, includes a keypad for communicating with the apparatus 114 and a slot for swiping a credit and debit card for effecting payment. The payment processing apparatus 114 can further include a slot for accepting money and a slot for providing change to the consumer. Adjacent to the working surface 105 is bagging station 116 having at least one bag 118 for enabling the consumer to bag each item after it is scanned.

Figure 3:
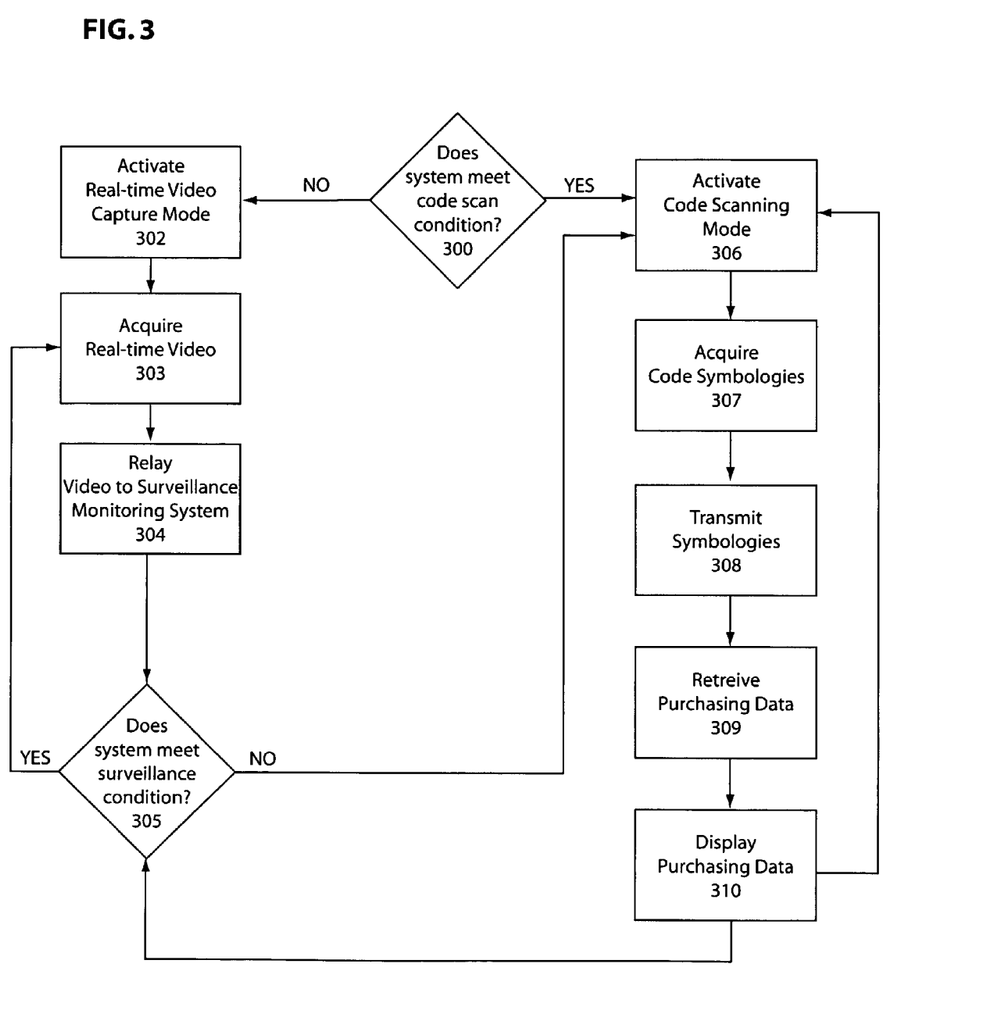
FIG. 3 is a flowchart illustrating a method of operation for the disclosed system in accordance with the present disclosure.

With reference to FIG. 3, there is shown a flowchart including steps for operating the barcode scanner 108 of the system 100 in accordance with the present disclosure. In step 300, based on whether the barcode scanner 108 has been removed from the cradle 110 (first embodiment) or whether an object is within a predetermined distance range from the barcode scanner 108 (second embodiment), the process proceeds to steps 302 or 306. If the scanner 112 has not been removed from the cradle 110 or an object is not within a predetermined distance range from the barcode scanner 108, step 302 places the barcode scanner 108 in the real-time video capture mode.

While the barcode scanner 108 is operating in the real-time video capture mode, step 303 acquires real-time video and step 304 relays the real-time video to a video surveillance monitoring system of the type known in the prior art. The process then proceeds to step 305 where in accordance to whether the barcode scanner 108 is within the cradle 110 or whether an object is within the predetermined distance range of the barcode scanner 108, the process proceeds to step 303 or step 306.

If the barcode scanner 108 has been removed from the cradle 110 or an object is within a predetermined distance range from the barcode scanner 108, then the process proceeds to step 306 from step 300. Step 306 places the barcode scanner 108 in the barcode imaging and decoding mode. Step 307 acquires an image of the barcode using the imager 200 of the barcode scanner 108. The data encoded by the acquired image is then decoded by the processing unit 208 in step 308 using at least one decoding algorithm for decoding at least one code symbology as known in the art. It is contemplated that the acquired image or data encoded therein is transmitted via the communications circuitry 209 to a processing unit located externally from the barcode scanner 108, such as a processing unit within the payment processing apparatus 114 or the cradle 110, for the decoding of the barcode data.

The decoded barcode data is then used to retrieve item and price information, as well as other information, in step 309. The data is retrieved by accessing a database storing such information. The retrieved information is then displayed on the monitor 112 in step 310. The process then proceeds to step 305.

In is contemplated that the switching mechanism can include other types of switching configurations, such as placing a mechanical lever within the cradle for effecting switching between the two modes when the lever is moved from one position to another position when the barcode scanner is placed within the cradle. The switching mechanism can also include a manual switch provided on the barcode scanner which when moved from one position to another position sends a signal to the processing unit for switching between the two modes. Accordingly, the described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A combination barcode imager/decoder and video capture system comprising:
   a barcode scanner having an imager wherein the barcode scanner is operated in at least two modes, and when operated in each mode of the at least two modes the imager generates at least one image, said barcode scanner configured for being positioned at a first and a second location; and
   a switching mechanism in operative communication with a processing unit of the barcode scanner, said switching mechanism configured to generate and transmit a signal to the processing unit for effecting a switching of a mode of operation of the barcode scanner in accordance with the location of the barcode scanner, between a video capture mode for generating a stream of images and a barcode imaging and decoding mode for generating at least one image including a barcode and for processing the imaged barcode, wherein the first and second locations are different, and wherein processing of a barcode for the purpose of decoding thereof is performed only when operating the barcode scanner in the barcode imaging and decoding mode of the two modes which include the video capture mode and the barcode imaging and decoding mode.

2. The combination system according to claim 1, further comprising a cradle for positioning the barcode scanner therein, and wherein the switching mechanism comprises a data interface connector within the cradle for interfacing with the barcode scanner when the barcode scanner is positioned within the cradle.

3. The combination system according to claim 2, wherein at least one signal is communicated to the processing unit from the data interface connector for switching the mode of operation of the barcode scanner from the barcode imaging and decoding mode to the video capture mode.

4. The combination system according to claim 1, further comprising communication means for transmitting video images to a surveillance system during operation of the barcode scanner in the video capture mode.

5. The combination system according to claim 1, further comprising:
   a monitor for displaying information acquired due to the decoding of at least one barcode during operation of the barcode seamier in the barcode imaging and decoding mode; and
   a payment processing apparatus for effecting payment for items scanned by the barcode scanner during operation of the barcode scanner in the barcode imaging and decoding mode.

6. The combination system according to claim 1, wherein the combination system is a point-of-sale station.

7. The combination system according to claim 1, wherein during operation of the barcode scanner in the video capture mode, the stream of images includes real-time video images corresponding to the field of view of the barcode scanner.

8. In a combination barcode imager/decoder and real-time video capture system having a processing unit, a method comprising:

operating a barcode scanner of the system in a video capture mode for capturing real-time video images when the barcode scanner is positioned at a first location; and operating a barcode scanner of the system in a barcode imaging and decoding mode for imaging and decoding a barcode when the barcode scanner is positioned at a second location, wherein the mode of operation of the system is selected in accordance with the position of the barcode scanner, the first and second locations are different locations, the imaging performed when operating in the first and second modes is performed by an imager of the barcode scanner, and processing of a barcode for the purpose of decoding thereof is performed only when operating the barcode scanner in the barcode imaging and decoding mode of the two modes which include the video capture mode and the barcode imaging and decoding mode.

9. In the combination system according to claim 8, the method further comprising displaying information acquired due to the decoding of at least one barcode during operation of the barcode scanner in the barcode imaging and decoding mode.

10. In the combination system according to claim 8, wherein the combination system is a point-of sale station.

11. In the combination system according to claim 8, wherein during operation of the barcode scanner in the video capture mode, the barcode scanner captures real-time video images corresponding to the field of view of the barcode scanner.

12. A method of operating a combination barcode imager/decoder and video capture system, the method comprising:

operating the system between a video capture mode for capturing video images and a barcode imaging and decoding mode for imaging and decoding a barcode, comprising:

sensing independently of the captured video images that art object is positioned within a predetermined distance range from an imager of the system;

freezing an image from the video images responsive to the sensing of the object;

determining whether the frozen image includes a barcode;

automatically switching from the video capture mode to the barcode imaging and decoding mode responsive to the determining that the frozen image includes the barcode;

operating the system in die barcode imaging and decoding mode upon switching including decoding the barcode; and transmitting the video images to a surveillance system during operation of the system in the video capture mode.

13. The method according to claim 12, the method further comprising displaying information acquired due to the decoding of at least one barcode during operation of the system in the barcode imaging and decoding mode.

14. The method according to claim 12, wherein when the imager is switched to the barcode imaging and decoding mode the imager re-images the object and decodes a barcode included in an image acquired via the re-imaging.

15. The method according to claim 12, wherein the system is a point-of-sale station.

16. The method according to claim 12, wherein during operation of the system in the video capture mode, the system captures real-time video images corresponding to the field of view of an imager of the system.

17. The method according to claim 12, wherein the decoding is performed upon the frozen image.

18. The method according to claim 12, wherein after the decoding, automatically switching from the barcode imaging and decoding mode to the video capture mode.

19. An integrated video and barcode imaging/decoding system comprising:

means for operating an imager in a video capture mode;

means for sensing independently of the images captured via the video capture mode when an object to be imaged is positioned within a predetermined distance range of the imager;

means for freezing at least one image captured during operation of the imager in the video capture mode responsive to the sensing of the object;

means for determining whether an image of the frozen at least one image includes a barcode; and means for decoding the barcode responsive to the determining that the frozen at least one image includes the barcode, wherein prior to the decoding, re-imaging the object, and performing the decoding using an image acquired via the re-imaging.

20. The system according to claim 19, wherein the means for decoding comprises means for switching the mode of operation of the imager from the video capture mode to a barcode decoding mode.

21. The system according to claim 19, wherein the decoding is performed upon the frozen image.

22. The system according to claim 19, wherein the imager continually operates in the video capture mode while the means for freezing freezes at least one image, the means for determining determines and the means for decoding decodes.

23. A combination barcode imager/decoder and video capture system comprising:

a barcode scanner having an imager, said barcode scanner configured for being positioned at a first location wherein said barcode scanner is positioned in operative communication with a data interface connector of a switching mechanism; and a switching mechanism in operative communication with a processing unit of the barcode scanner, said switching mechanism configured to generate and transmit a signal to the processing unit for effecting a switching of a mode of operation of the barcode scanner in accordance with positioning the barcode scanner at die first position or a second position wherein the mode of operation is switched between a video capture mode for generating a stream of images by the imager when the barcode scanner is positioned at the first location and a barcode imaging and decoding mode for generating at least one image of a barcode by the imager and processing the imaged barcode when the barcode scanner is positioned at the second location, wherein the first and second locations are different locations, and processing of a barcode for the purpose of decoding thereof is performed only when operating the barcode scanner in the barcode imaging and decoding mode of the two modes which include the video capture mode and the barcode imaging and decoding mode.

24. An integrated video and barcode imaging/decoding system comprising:
   an imager operating in a video capture mode for capturing video images;
   a proximity sensor for sensing when an object to be imaged is positioned within a predetermined distance range of the imager independently of the captured video images;
   circuitry for freezing at least one image captured during operation of the imager in the video capture mode upon sensing that the object is positioned within the predetermined distance range; and
   a processor for determining whether an image of the frozen at least one image includes a barcode, wherein if the processor determines that the at least one image includes a barcode, the processor switches the mode of operation of the imager from the vide capture mode to a barcode imaging and decoding mode, in order to re-image and decode the barcode.

25. The combination system according to claim 24, further comprising communication means for transmitting video images to a surveillance system during operation of the barcode scanner in the video capture mode.

26. The combination system according to claim 24, further comprising:
   a monitor for displaying information acquired due to the decoding of at least one barcode during operation of the barcode scanner in the barcode imaging and decoding mode; and
   a payment processing apparatus for effecting payment for items scanned by the barcode scanner during operation of the barcode scanner in the barcode imaging and decoding mode.

27. The combination system according to claim 24, wherein the combination system is a point-of-sale station.

28. The combination system according to claim 24, wherein during operation of the barcode scanner in the video capture mode, the barcode scanner captures real-time video images corresponding to the field of view of the barcode scanner.

29. In a combination barcode imager/decoder and real-time video capture system having a processing unit, a method comprising:
   capturing images in a video capture mode;
   sensing independently of the captured images when an object to be imaged is positioned within a predetermined distance range of an imager of the combination system;
   freezing at least one image captured during operation of the imager in the video capture mode upon sensing that the object is positioned within the predetermined distance range;
   determining whether an image of the frozen at least one image includes a barcode; and
   decoding the barcode when it is determined that the frozen at least one image includes the barcode, wherein prior to the decoding, re-imaging the object, and performing the decoding using an image acquired via the re-imaging.

30. In the combination system according to claim 29, the method further comprising transmitting the real-time video images to a surveillance system during operation of the barcode scanner in the video capture mode.

31. In the combination system according to claim 29, the method further comprising displaying information acquired due to the decoding of at least one barcode during operation of the barcode scanner in the barcode imaging and decoding mode.

32. The combination system according to claim 29, wherein in the method the decoding is performed upon the frozen image.

33. The combination system according to claim 29, wherein in the method, the combination system continuously captures images in the video capture mode during the sensing freezing, determining and decoding.

* * * * *

UNITED STATES PATENT AND TRADEMARK OFFICE
CERTIFICATE OF CORRECTION

PATENT NO. : 7,293,711 B2  Page 1 of 1
APPLICATION NO. : 10/929936
DATED : November 13, 2007
INVENTOR(S) : Brock It is certified that error appears in the above-identified patent and that said Letters Patent is hereby corrected as shown below:

IN THE CLAIMS

1. In Column 6, Line 60, in Claim 5, delete "seamier" and insert -- scanner --, therefor.

2. In Column 7, Line 47, in Claim 12, delete "art" and insert -- an --, therefor.

3. In Column 7, Line 58, in Claim 12, delete "die" and insert -- the --, therefor.

4. In Column 8, Line 56, in Claim 23, delete "die" and insert -- the --, therefor.

5. In Column 9, Line 20, in Claim 24, delete "vide" and insert -- video --, therefor.

6. In Column 10, Line 38, in Claim 33, delete "sensing" and insert -- sensing, --, therefor.

Signed and Sealed this

Twenty-fourth Day of November, 2009

David J. Kappos
*Director of the United States Patent and Trademark Office*